(12) United States Patent
Jagusch

(10) Patent No.: US 7,628,684 B2
(45) Date of Patent: Dec. 8, 2009

(54) MONOLITHIC BACON HANGER

(75) Inventor: Wayne E. Jagusch, Arlington Heights, IL (US)

(73) Assignee: Beacon, Inc., Hillside, IL (US)

( * ) Notice: Subject to any disclaimer, the term of this patent is extended or adjusted under 35 U.S.C. 154(b) by 0 days.

(21) Appl. No.: 11/686,072

(22) Filed: Mar. 14, 2007

(65) Prior Publication Data

US 2008/0176500 A1 Jul. 24, 2008

Related U.S. Application Data

(60) Provisional application No. 60/886,391, filed on Jan. 24, 2007.

(51) Int. Cl.
*A22C 15/00* (2006.01)

(52) U.S. Cl. .................................. 452/193; 452/187

(58) Field of Classification Search .............. 452/185, 452/187, 193
See application file for complete search history.

(56) References Cited

U.S. PATENT DOCUMENTS

| | | | |
|---|---|---|---|
| 935,171 A | 9/1909 | Stark et al. | |
| 974,200 A | 11/1910 | Skewer | |
| 979,945 A | 12/1910 | Harnischfeger | |
| 998,286 A | 7/1911 | Fisher | |
| 1,006,007 A | 10/1911 | Rispel | |
| 1,058,387 A | 4/1913 | Rastman | |
| 1,177,188 A * | 3/1916 | Keller | 452/193 |
| 1,618,833 A * | 2/1927 | Koll | 452/193 |
| 1,825,879 A | 10/1931 | Louthian | |
| 1,870,729 A | 8/1932 | Hulseberg | |
| 1,915,293 A | 6/1933 | Couey | |
| 1,915,294 A * | 6/1933 | Covey | 452/193 |
| 1,936,380 A | 11/1933 | Conquest et al. | |
| 1,967,870 A | 7/1934 | Couey | |
| 2,412,233 A | 12/1946 | Tominello | |
| 3,090,990 A | 5/1963 | Graper | |
| 4,172,305 A | 10/1979 | Henebry et al. | |
| 5,100,365 A * | 3/1992 | Johnson | 452/187 |
| 5,423,721 A | 6/1995 | Roush et al. | |
| 5,938,522 A | 8/1999 | Jagusch et al. | |
| 6,506,108 B1 | 1/2003 | Jagusch | |
| 7,182,686 B2 | 2/2007 | Jagusch | |
| 2006/0137537 A1 | 6/2006 | Christensen | |
| 2006/0199488 A1 | 9/2006 | Niemiec | |

* cited by examiner

*Primary Examiner*—David J Parsley
(74) *Attorney, Agent, or Firm*—McAndrews, Held & Malloy, Ltd.

(57) ABSTRACT

A hanger designed for supporting pork bellies during handling and processing into slabs of bacon. The hanger is characterized by a plate comprised of an integral support member, and an integral generally rectangular base frame made from the plate that lies in a first plane and an integral plurality of prongs that extend generally normal to the plate plane. The prong members may be at different elevations to ensure engagement with the cutaneous trunci muscle. The bacon hanger preferably includes a spaced extension which provides for a space between the pork belly and the plate member.

12 Claims, 6 Drawing Sheets

MONOLITHIC BACON HANGER

CROSS-REFERENCE TO RELATED APPLICATION

This application makes reference to, claims priority to and claims benefit from U.S. Provisional Patent Application Ser. No. 60/886,391, entitled "Bacon Hanger" and filed on Jan. 24, 2007.

STATEMENT REGARDING FEDERALLY SPONSORED RESEARCH OR DEVELOPMENT

None.

BACKGROUND OF THE INVENTION

This invention relates to equipment for supporting and handling articles, particularly meat products, in manufacturing and for supporting pork bellies during processing to form slabs of bacon.

In the slaughtering or butchering of hogs the various portions or cuts into which the animal carcass is divided are prepared for marketing by meat packers and processors according to the type of cut and the form in which it is desired to present it to the consumer. Generally, cuts known as pork bellies are processed by suspending them for a predetermined time in a processing area, such as a smoke house, or similar curing area, where they are converted into slabs of bacon which may be supplied to the consumer in a solid piece or cut into slices after sizing and packaged to provide the familiar sliced bacon package.

In the conventional slaughtering and processing operation, pork bellies are transported from the receiving or cutting area to an area where they are located onto bacon hangers, which serve to support the bellies on a tree or rack while they are being processed. When the processing or curing is completed, the bacon slabs are removed from the hangers enabling reuse of the latter.

The bacon hangers which have been provided heretofore have been formed with pointed prongs or teeth arranged as in a comb on a common plane and mounted on a frame depending from a bracket member which is shaped or otherwise formed for engaging an overhead rail, track bar, smokestick or the like. Generally, the hangers have been constructed so that the hanger teeth or prongs can be readily inserted into the relatively soft area along the top ends (typically called the brisket end) of the bellies by pressing the prongs into the same. Some portion of the frame may serve as a handle for gripping the hanger while guiding the prongs into the meat and lifting the hanger and pork belly onto the rail, track bar, rack or tree. The end points of pointed prongs of the previous bacon hangers were generally in the same plane.

Bacon hangers provided heretofore mostly consisted of hangers fabricated from stainless steel rods. These hangers were welded together introducing a possible weak point at the point of weldment if not properly welded or the weld was fatigued.

The top end of the pork bellies consists mostly of fat, some muscle identified as lean, and at a lower level there is a muscle called the cutaneous trunci (CT) muscle. This muscle extends through a substantial part of the length of the pork belly. The CT muscle is relatively small at the top portion of the belly becoming larger as it extends down the length of the belly. The amount of the CT muscle that appears in the final sliced product determines whether or not the product meets a lean specification. Most often, the prongs of the present hangers are arranged in a common plane such that when they are inserted into the top end of the pork belly they fail to engage the CT muscle, engaging mostly fat and minimal lean. Because the CT muscle extends for most of the length of the pork belly and is stronger and denser than fat, it is desirable that at least one pair of prongs penetrate the CT muscle thus providing additional support for the entire belly. Additionally, during processing, the CT muscle shrinks affecting the amount of muscle in the final product, thus affecting yield. Without engaging and supporting the CT muscle, the pork bellies elongate on the hangers as they are processed. This elongation is undesirable because it causes a higher percentage of fat in the top section. This higher density of fat causes this top section to fail to meet the lean specifications established for the final processed product, resulting in a section with minimal or no commercial value, therefore, reducing product yield. Further, the elongation of the pork bellies on the hanger causes physical clearance problems as the bellies move along during processing.

For the foregoing reasons, there is a need for a hanger such that the device is not disposed to the disadvantages of the prior art.

SUMMARY OF THE INVENTION

It is a general object of the present invention to provide an improved structure for use in handling cuts of meat, particularly pork bellies, following slaughtering operations and during subsequent handling and processing operations.

A further object of the invention is to provide an improved hanger structure made from a solid piece of material and having a plurality of spaced prongs for insertion into pork bellies and removal from pork bellies or similar cuts so as to support the same during handling and/or processing.

Still another object of the invention is to provide an improved bacon hanger structure having meat penetrating prongs arranged to extend in planes at an angle to the plane of a plate member, with the plate member being adapted to be disposed in a substantially vertical plane and the prongs which are integral to the plate member and are bent at an angle to the vertical plane of the plate member.

Another object of the invention to provide a bacon hanger that is specially adapted to ensure that the CT muscle is purposefully engaged by at least one pair of prongs to maintain the CT muscle in the upper portion of the pork belly, and reduce subsequent pork belly elongation during processing and transportation of the meat thus resulting in higher yield from the pork belly or meat product.

Another object of the invention to provide a new and improved hanger structure that is especially adapted for suspending pork bellies and removal of the hanger from the bellies so as to facilitate handling, cleaning, storage, retrieval and processing to convert the bellies into slabs of bacon wherein the hanger is provided with a backward protrusion which is arranged relative to the prongs so as to enable engagement by a mechanical device that is adapted for withdrawing the bacon hanger from the processed pork belly.

The invention as disclosed and claimed herein comprises a bacon hanger which will generally be cut from a single piece of material, to include a hook, a plate member disposed from the hook, a hand-gripping member integral to the main plate member a plurality of spaced article engaging prongs integral to the plate member extending generally normal to the plane of the plate and preferably a spaced member extending from the vertical plate member. The spaced member controls the extent to which the prongs are inserted into the pork belly, prevents the pork belly from coming in contact with and adhering to the plate, and allows the engagement by a mechanical device when the belly must be removed from the hanger. The bacon hanger may have a plate extension extending from the main plate member with at least one pair of prongs extending from the plate extension member disposed in a parallel plane at a different elevation than other prongs.

The aforesaid and other objects and advantages of the invention will become more apparent upon consideration of the preferred form of the hanger structure which is illustrated in the accompanying drawings wherein like parts are identified by the same numerals throughout the views.

DESCRIPTION OF THE PREFERRED EMBODIMENT OF THE INVENTION

Figure 1:
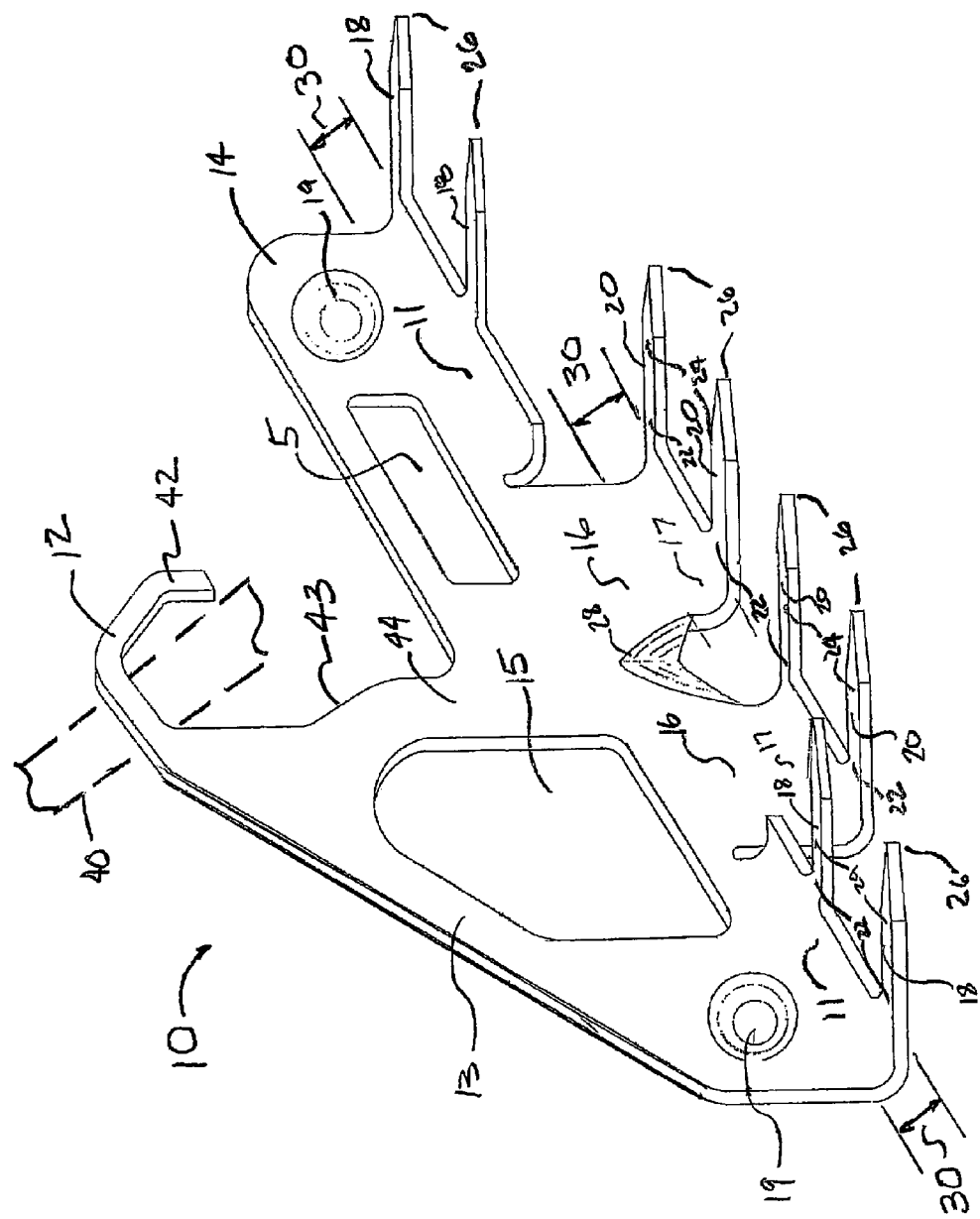
FIG. 1 is a perspective view of the plate hanger structure showing the solid piece of material, the spaced relationship between the plate member and the prongs, the hand gripping member, and the spaced relationship of the prongs.

As illustrated in the drawings, hanger 10 is designed particularly for use in suspending pork bellies for transportation and during processing or curing, such as a smoke house, cooking oven, curing or cooling area. The hanger is designed so that it may be hung on a tree, on a truck, rail or rack and moved to or through the processing area or system where it may be supported in the same manner or carried on a conveyor, or the like, during the processing and subsequent handling.

To the extent that the hangers depicted in the accompanying figures retain common or comparable elements from figure to figure, the same reference numerals will be applied to such elements, which will not always be separately explained for such figure.

Figure 2:
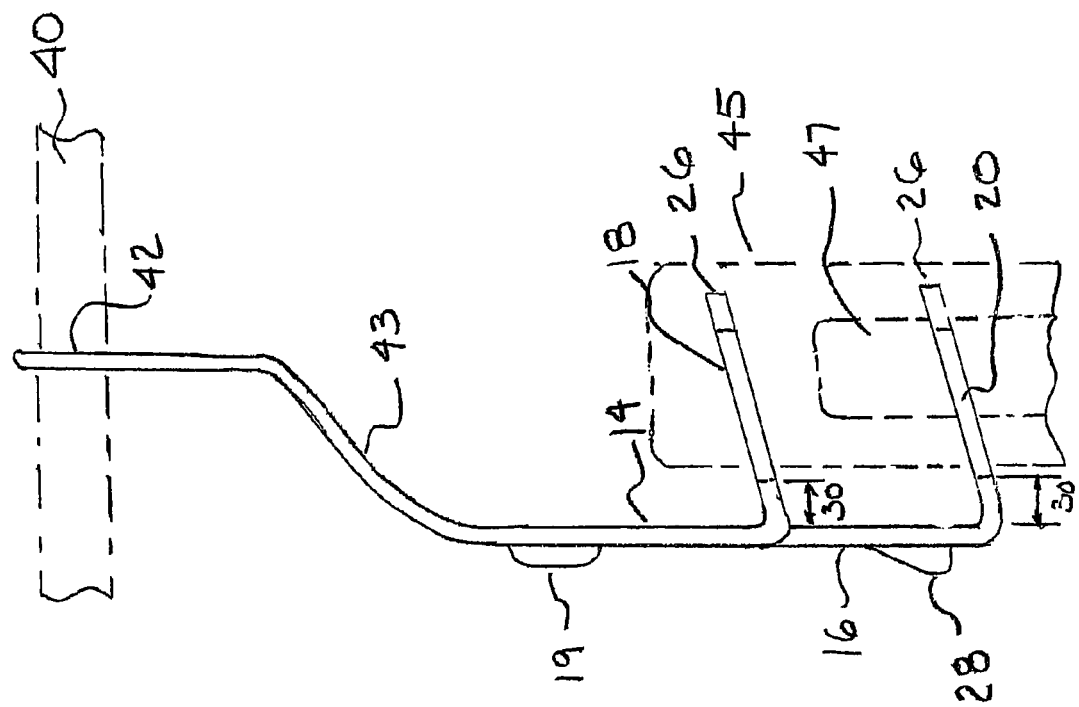
FIG. 2 is an end view of a hanger structure which is particularly adapted for use in suspending cuts of meat in a processing area with the hanger being shown in the position it will assume when mounted on an overhead support bar or rack member and showing the spaced relationship between the prongs at various elevations.

Referring to FIGS. 1 and 2, bacon hanger 10 comprises a support structure cut from a single piece of structurally suitable material to include a hook member 12, a plate member 14 disposed from the hook member 12, a plurality of meat engaging prongs 18 which extend generally normal to plate member 14, a plate extension 16 that is integral to plate member 14 having a plurality of meat engaging prongs 20 which extend generally normal to plate extension 16 and generally in a parallel plane to the plane of prongs 18.

Hook-forming bracket 12, which is integral to plate member 14, is provided to support plate member 14 from a rack or support bar as indicated in phantom line at 40. Plate member 14 is deposed from hook-forming bracket 12. Preferably, hook forming bracket 12 is formed from a single piece of material that comprises bacon hanger 10. Those skilled in the art will appreciate that the hook forming bracket 12 can be formed separately and mechanically attached to plate member 14. Hook forming bracket 12 is best shown to provide a downwardly opening hook 42 at the top and a terminal end section 44 that is in the same plane as plate member 14. Intermediate portion 43 may be bent to position the hook 42 in a vertical plane offset and substantially parallel to the plane of plate member 14 for better balance in handling and suspension of the pork belly 45.

In addition to the hook forming bracket 12, bacon hanger 10 is provided with a hand-gripping member 13 extending integrally from plate member 14 to the hook forming bracket 12.

Integral to plate member 14 is plate spacing member 11. Plate spacing member 11 intersects with the plane of plate member 14 and extends in a plane that is generally normal to plate member 14. Plate spacing member 11 creates space 30 and controls the extent to which the prongs 18 are inserted into the pork belly 45. When the pork belly 45 is engaged on bacon hanger 10, the space 30 provides an opening between plate member 14 and pork belly 45. This space 30 allows improved processing of pork belly 45, prevents the touching and sticking of pork belly 45 to hanger 10, and facilitates removal of bacon hanger 10 from pork belly 45 by hand or by a mechanical device (not shown).

Integral to plate spacing member 11 are a plurality of meat engaging prongs 18. Prongs 18 are integral to plate spacing member 11 and extend in the same plane as plate spacing member 11 and are preferably at an acute angle to the plane of plate member 14. This side of plate member 14 is called the prong side. The side of plate member 14 that is opposite the prong side is called the backside.

Prong 18 comprises a first width 22 that is preferably integral to plate spacing member 11. First width 22 is generally wide enough to prevent separating or breaking of prong 18 from plate spacing member 11. Prong member 18 has a second width 24 opposite first width 22. This width 24 is a least as wide as first width 22 and can be smaller to facilitate insertion into the pork belly 45. The end of prong 18 is cut to form a blade point 26 to facilitate penetration into the pork belly 45.

Plate member 14 preferably has at least one hole 15 that passes completely through plate member 14 to facilitate controlled atmosphere of processing air to circulate through the hole(s). Hole 15 forms one side of hand-gripping member 13 and permits stacking of a plurality of bacon hangers 10 on carriers for transportation, storage and retrieval. Plate member 14 has a prong side and a backside. Another hole 5 is shown to facilitate stacking and air circulation. Preferably holes 5 and 15 facilitate the controlled location stacking and destacking of bacon hangers 10 to facilitate manual or mechanical insertion/removal of bacon hanger 10 from the pork belly 45. Two holes are contemplated in FIG. 1, however, any number of holes can be added as long as the structural integrity of the hanger 10 is maintained. The holes shown in plate member 14 may be of any shape or size. Preferably plate member 14 has at least two raised protrusions 19 that protrude from the backside of plate member 14 and provide for spacing between individually stacked bacon hangers 10. Protrusions 19 allow for air circulation, separation, and for sanitation among individual stacked bacon hangers 10. It is contemplated that protrusion 19 protrudes from the backside of plate 14 and forms a concave depression on the prong side of plate member 14.

Integral with plate member 14 and extending in a vertical direction from plate member 14 is plate extension 16. Plate extension 16 may be in the same plane as plate member 14.

Preferably, plate extension 16 is formed from the single piece of material that comprises bacon hanger 10. Plate extension 16 extends from plate member 14 generally on the opposite side of plate member 14 from hook forming bracket 12. While it is contemplated that plate extension member 16 is integral and a seamless extension of plate member 14, a person skilled in the art will appreciate that extension 16 may be formed from a separate piece of material that is compatible with plate member 14 and mechanically attached to plate member 14.

Integral to plate extension 16 is second plate spacing member 17. Plate spacing member 17 intersects with the plane of plate extension 16 extends on the prong side of bacon hanger 10 and is substantially normal to the plane of plate extension 16. Second plate spacing member 17 creates space 30 and controls the extent to which prongs 20 are inserted into the pork belly 45. When pork belly 45 is engaged on bacon hanger 10, the space 30 provides an opening between plate extension member 16 and the pork belly 45. This space 30 allows improved and consistent curing of the pork belly 45, prevents sticking of pork belly 45 to plate extension 16, and facilitates removal of bacon hanger 10 from pork belly 45 by hand or by a mechanical device (not shown).

Integral to second plate spacing member 17 are a plurality of meat engaging prongs 20. The prongs 20 extend from the prong side of second plate spacing member 17 in the same plane as second plate spacing member 17, preferably at an acute angle to the plane of plate extension member 16.

Prong 20 comprises a first width 22 that preferably extends from second spacing member 17. First width 22 is generally wide enough to prevent separating or breaking of prong 20 from plate spacing member 17. Prong 20 has a second width 24 opposite first width 22. This width 24 can be smaller to facilitate insertion of prong 20 into the pork belly 45. The end of prong 20 is cut to form a blade point 26 to facilitate penetration into the pork belly 45.

Plate extension 16 has a backward protrusion 28 at the intersection of prongs 20 and plate extension 16. Protrusion 28 allows for stacking, sanitation and spacing between bacon hangers 10 and for potential mechanical removal of bacon hangers 10 from the processed belly. Protrusion 28 allows the engagement of a mechanical or pneumatic device to remove the bacon hangers 10 from the processed pork belly 45.

In the form shown in FIG. 2, the angle of the prongs 18 and 20 relative to plane of hook 42 is so determined to have the prongs in a plane at a slight angle above horizontal. When a pork belly 45 is on the hanger 10, the prongs disposed at an acute angle to the horizontal and the lateral offset of the intermediate portion 43 of the support member 12 eliminates the possibility of the belly slipping off the hanger. It is contemplated that individual pairs of prongs 18 and prongs 20 may be at different elevations in relationship to each other. Further, the elevation of prongs 20 of extension 16 may be on a common plane lower than the plane of prongs 18 extending from the plate spacing member 11. It is contemplated that prongs 20 spaced below the common plane of the other prongs 18 will allow engagement of the cutaneous trunci muscle 47 by the lower disposed prongs 20 from second plate spacing member 17. The intermediate portion 43 of hook forming bracket 12 is shown bent to position hook 42 in a vertical plane offset from the plane of plate member 14 for better balance in handling and suspension of the pork belly 45. The plate spacing members 11 and 17 control the extent to which prongs 18 and 20 are inserted into the pork belly 45. Space 30 provides an opening that allows for better processing and facilitates removal of the bacon hanger 10 from the pork belly 45.

In using hanger 10, one or more pork bellies 45 may be suspended depending on their size relative the size of hanger 10. The prongs 18 may be conveniently engaged in the top marginal portion of the meat and prongs 20 may be engaged in the cutaneous trunci muscle while the user grasps the hand-griping member 13. When the withdrawal of bacon hanger 10 is desired, it is facilitated by utilizing a mechanical gripping device (not shown) to engage protrusion 28 and/or space 30 and pull in the direction away from the pork belly 45 thereby exerting a withdrawal force substantially in the plane of the prongs 18 and 20.

When bacon hanger 10 is not in use, it can be easily stored and stacked with other bacon hangers of similar type. The protrusions 19 and 28 in conjunction with space 30 permits easier sanitation and storage.

Figure 3:
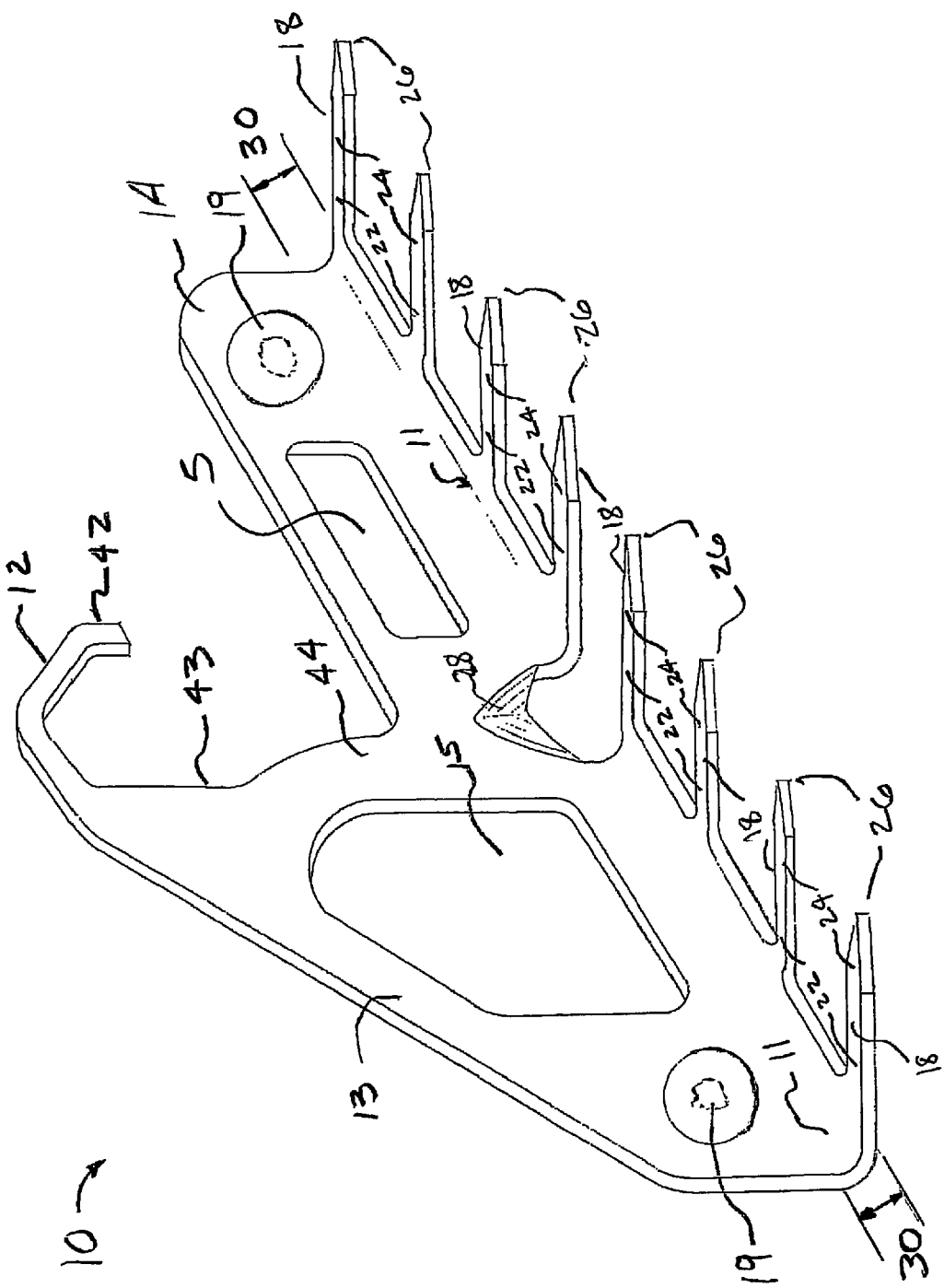
FIG. 3 is a perspective view of another embodiment of the hanger structure of the present invention showing the spaced extension.

FIG. 3 shows a second embodiment of the present invention. FIG. 3 is similar to the bacon hanger 10 shown in FIG. 1. Referring to FIG. 3, bacon hanger 10 comprises a support structure cut from a single piece of structurally suitable material to include a hook member 12, a plate member 14 disposed from the hook member 12, a plurality of meat engaging prongs 18 on the same plane which extend generally normal to plate member 14, a hand gripping member 13, and a spaced extension member 11.

Figure 4:
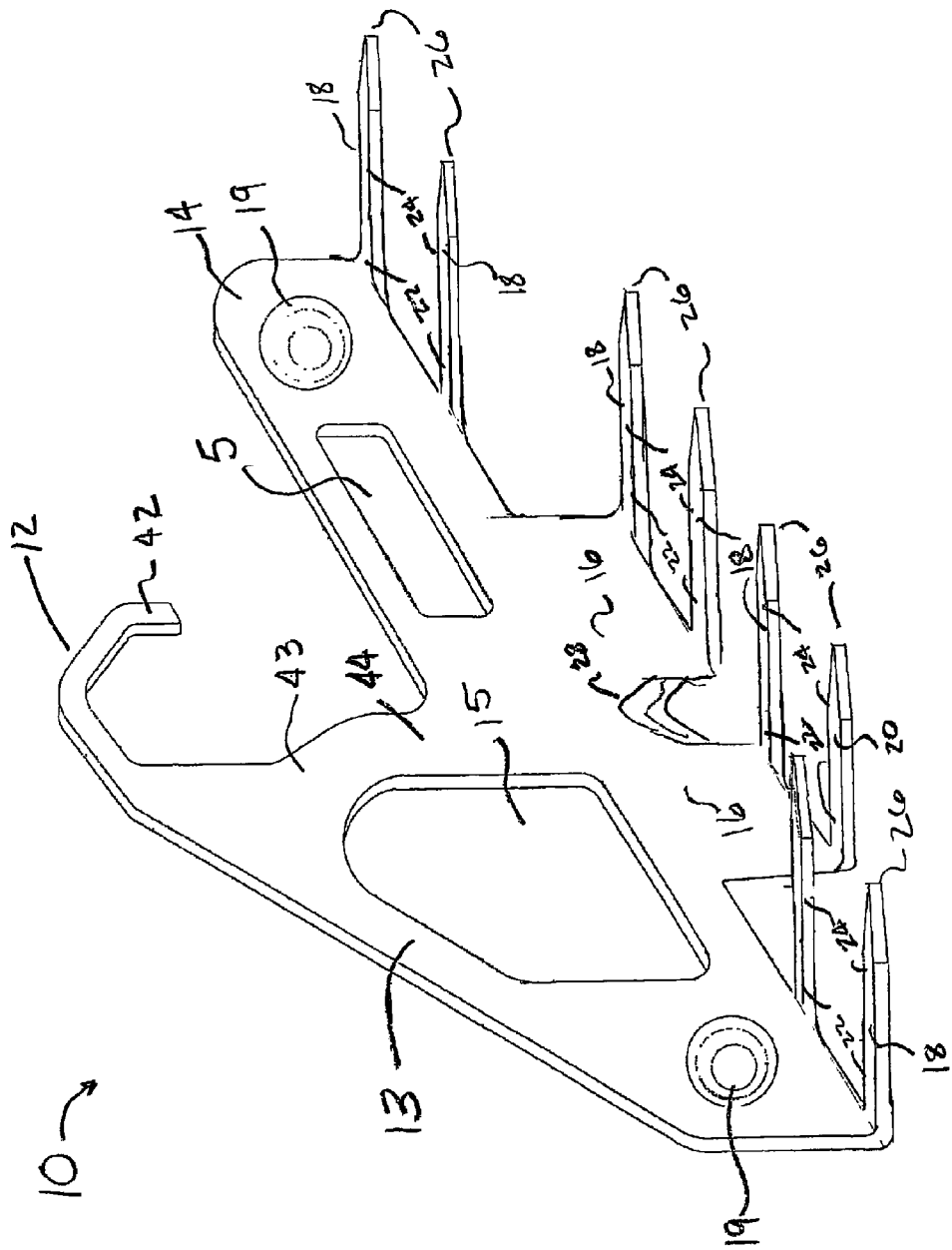
FIG. 4 is a perspective view of another embodiment of the plate hanger structure showing the solid plate and the spaced relationship of the prongs.

FIG. 4 shows another embodiment of the present invention. The hanger 10 in FIG. 4 is similar to FIG. 1, the difference being that the spaced extension members 11 and 17 are eliminated.

Figure 5:
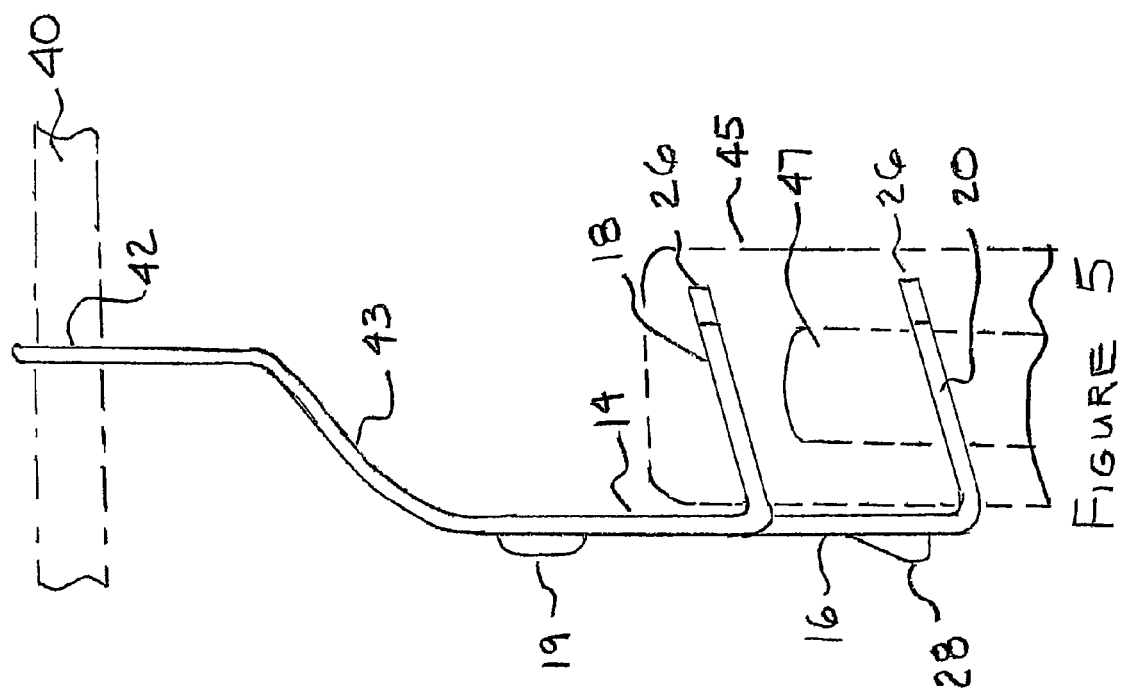
FIG. 5 is an end view of the hanger structure shown in FIG. 4.

FIG. 5 shows an end view of the bacon hanger shown in FIG. 4.

Figure 6:
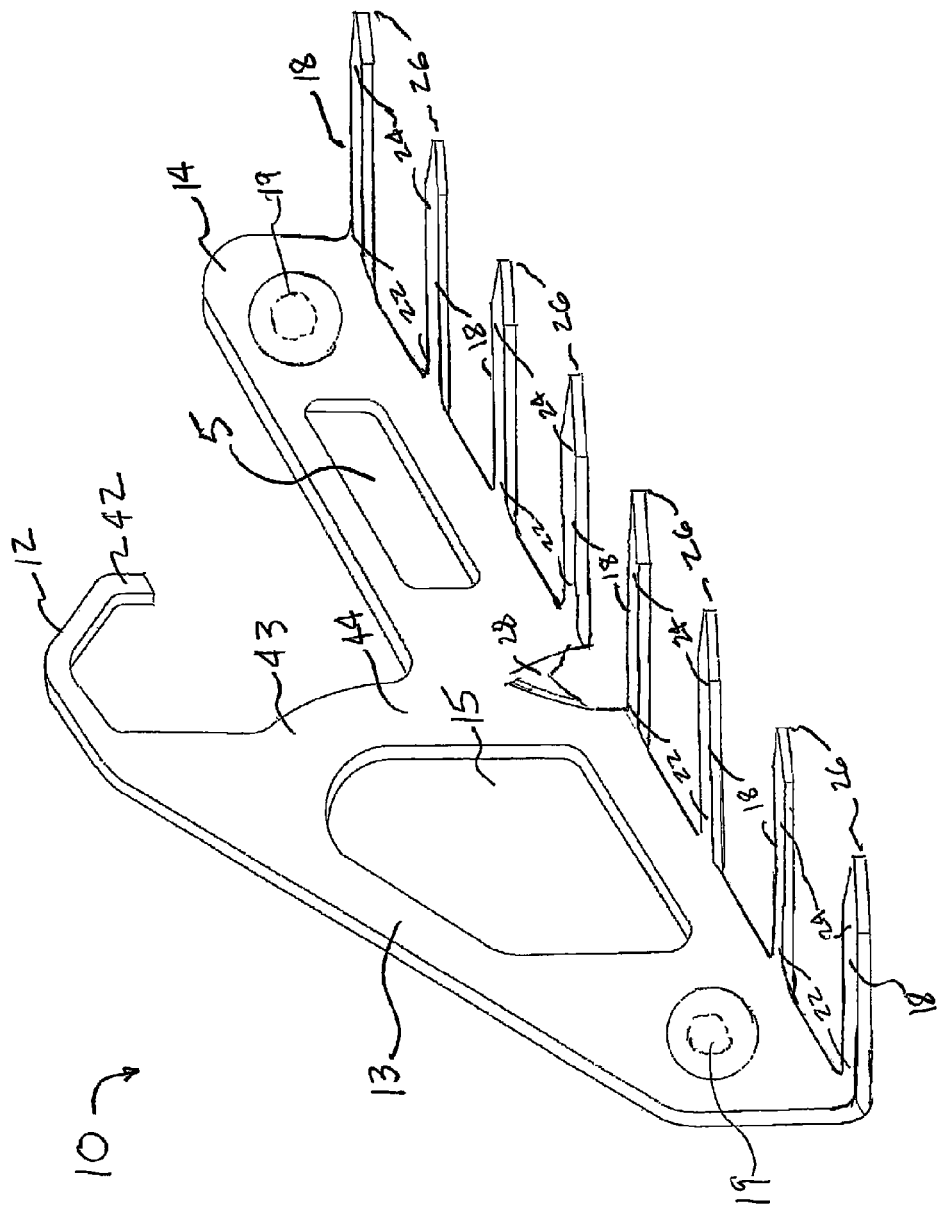
FIG. 6 is a perspective view of another embodiment of the plate hanger structure.

FIG. 6 shows another embodiment of bacon hanger 10. The hanger 10 in FIG. 6 is similar to FIG. 3, the difference being that the spaced extension member 11 is eliminated.

FIGS. 1 through 6 show bacon hanger 10 with a total of eight meat engaging prongs. Persons skilled in the art will appreciate that any total number of prongs may be used in bacon hanger 10 with different combinations of prongs 18 and prongs 20.

The hanger structures 10 in the forms illustrated are fabricated from plates of metal material, of suitable thickness, which are cut and bent as shown. Preferably, the plate material will be stainless steel to afford the most desirable sanitation before use. It will be understood by those skilled in the arts that bacon hanger 10 may be fabricated from other material or a material that is coated with a suitable material that affords the same desirable sanitation qualities as stainless steel.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

What is claimed is:

1. A monolithic hanger structure adapted for suspending a meat product during processing comprising: a solid, generally rectangular base member adapted to be positioned in a generally vertical plane; the solid base member having a prong side and a backside, a support member edge and a prong member edge opposite the support member edge; an integral support member adapted to engage an overhead structure; a plurality of blade pointed prongs adapted to penetrate through and be pressed into engagement with the meat product, wherein the plurality of the blade pointed prongs solely directly support at least a portion of the meat muscle within the meat product, the plurality of blade pointed prongs disposed at a plurality of vertically spaced apart elevations below the prong member edge of the solid base member; a plate extension member integral to the base member; a base member spacing spaced extension integral to the base member and the plurality of blade pointed prongs, the base member spacing spaced extension forming a processing air circulating space and separating both the base member and the plate extension member from the blade pointed prongs, the base member spacing spaced extension generally normal to and extending from the prong side of the base member and the plate extension member; and a plate extension spacing extension integral to the plate extension member and the plurality of blade pointed prongs, the plate extension spacing extension forming a processing air circulating space and separating the plate extension member from the blade pointed prongs, the plate extension spacing extension generally normal to and extending from the prong side of the plate extension member.

2. A monolithic hanger structure as set forth in claim 1 wherein the support member is a hook having an open end, an intermediate section and a closed end, and the base member depends from the closed end of the hook.

3. A monolithic hanger structure as set forth in claim 2 wherein the intermediate section of the hook has a lateral offset from the generally vertical plane of the base member.

4. A monolithic hanger structure as set forth in claim 1 wherein the plate extension member extends in the same plane as the base member from the prong member edge opposite the support member edge of the base frame.

5. A monolithic hanger structure as set forth in claim 1 wherein the base member spacing spaced extension extends in a lateral direction from and at an acute angle to the base member and forms a space between the base member and the plurality of blade pointed prongs.

6. A monolithic hanger structure as set forth in claim 1 wherein the plate extension spacing spaced extension extends in a lateral direction from and at an acute angle to the plate extension member and forms a space between the plate extension and the plurality of blade pointed prongs.

7. A monolithic hanger structure as set forth in claim 1 wherein the prongs are integral to the spacing spaced extension and extend laterally from the spaced extension in a plurality of vertically spaced apart elevations.

8. A monolithic hanger structure as set forth in claim 1 wherein the prongs have a first width integrally attached to the spacing spaced extension, a second width and a terminal blade pointed end whereby the prongs extend at a plurality of elevations with relation to each other.

9. A monolithic hanger structure as set forth in claim 8 wherein at least one pair of prongs is disposed at an elevation that is lower than the remaining prongs.

10. A monolithic hanger structure as set forth in claim 1 wherein the base member has at least one protrusion protruding from the backside of the base member forming a concave depression on the prong side of the base member.

11. A monolithic hanger structure as set forth in claim 1 wherein the hanger structure has a least one opening for controlled location stacking and destacking.

12. A monolithic hanger structure as set forth in claim 1 wherein the plate extension member contains a cutout between two of the plurality of prongs to provide for an engagement space for a monolithic hanger structure removal device.

* * * * *